United States Patent [19]
Reininger

[11] Patent Number: 6,100,974
[45] Date of Patent: *Aug. 8, 2000

[54] IMAGING SPECTROMETER/CAMERA HAVING CONVEX GRATING

[75] Inventor: Francis M. Reininger, Irvine, Calif.

[73] Assignee: California Institute of Technology, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/153,381

[22] Filed: Sep. 15, 1998

Related U.S. Application Data

[60] Provisional application No. 60/059,038, Sep. 16, 1997.

[51] Int. Cl.[7] ........................................... G01J 3/00
[52] U.S. Cl. .......................... 356/300; 356/303; 356/305; 356/328
[58] Field of Search .................................. 356/300, 305, 356/303, 328, 329

[56] References Cited

U.S. PATENT DOCUMENTS 5,266,795  11/1993  Vaughan .
5,768,040   6/1998  Macenka et al. .
5,880,834   3/1999  Chrisp .

OTHER PUBLICATIONS

Offner "New Concepts in Projection Mask Aligners" *Optical Engineering*, vol. 14, No. 2, Mar.–Apr. 1975, pp. 130–132.
Mertz "Concentric Spectrographs" *Applied Optics*, vol. 16, No. 12, Dec. 1977, pp. 3122–3124.
Reininger et al. "Visible Infrared Mapping Spectrometer—Visible Channel (VIMS–V)" *SPIE*, vol. 2198, Mar. 13–14, 1994, pp. 239–250.
Reininger "Near Ultraviolet Visible Infrared Mapping Spectrometer (NU–VIMS)" *SPIE*, vol. 2209, Apr. 19–22, 1994, pp. 332–344.
Lobb "Theory of Concentric Designs for Grating Spectrometers" *Applied Optics*, vol. 33, No. 13, May 1, 1994, pp. 2648–2658.
Reininger et al. "VIRTIS: Visible Infrared Thermal Imaging Spectrometer forthe Rosetta Mission" *SPIE*, vol. 2819, Aug. 7–8, 1996, pp. 66–77.

*Primary Examiner*—Frank G. Font
*Assistant Examiner*—Reginald Ratliff
*Attorney, Agent, or Firm*—Christie, Parker & Hale, LLP

[57] ABSTRACT

An imaging spectrometer has fore-optics coupled to a spectral resolving system with an entrance slit extending in a first direction at an imaging location of the fore-optics for receiving the image, a convex diffraction grating for separating the image into a plurality of spectra of predetermined wavelength ranges; a spectrometer array for detecting the spectra; and at least one concave sperical mirror concentric with the diffraction grating for relaying the image from the entrance slit to the diffraction grating and from the diffraction grating to the spectrometer array. In one embodiment, the spectrometer is configured in a lateral mode in which the entrance slit and the spectrometer array are displaced laterally on opposite sides of the diffraction grating in a second direction substantially perpendicular to the first direction. In another embodiment, the spectrometer is combined with a polychromatic imaging camera array disposed adjacent said entrance slit for recording said image.

37 Claims, 9 Drawing Sheets

IMAGING SPECTROMETER/CAMERA HAVING CONVEX GRATING

This application is a continuation of U.S. patent application No. 60/059,088 filed on Sep. 16, 1997.

GOVERNMENT LICENSE RIGHTS

The U.S. Government has certain rights in this invention pursuant to Contract No. NAS7-1407 awarded by NASA.

BACKGROUND OF THE INVENTION

The present invention relates generally to imaging spectrometers or "spectrographs" having convex gratings, and more particularly to a compact spectrometer having very low spatial and spectral distortion, optionally combined with a high resolution polychromatic imaging camera.

In many applications, including remote sensing for space and terrestrial exploration, it is desirable to measure incoming radiation in narrow spectral slices from the infrared to the ultraviolet. This has been accomplished using a reflective spectrometer in an "Offner" configuration, i.e., one having a convex diffraction grating in combination with at least one concentric concave mirror, typically operating at unit magnification. Various concentric spectrometer concepts, including the Offner configuration, are disclosed in L. Mertz, "Concentric Spectrographs", *Applied Optics*, Vol. 16, No. 12 (December 1977), and D. R. Lobb, "Theory of Concentric Designs for Grating Spectrometers", *Applied Optics*, Vol. 33, No. 13 (May 1, 1994). Such spectrometers can be coupled to fore-optics which are constructed to receive radiation from a target surface and form an image on an entrance slit of the spectrometer. The devices are typically operated in "pushbroom" fashion, during which the device moves in a direction substantially perpendicular to the entrance slit to cover a swath of a target surface. In the course of this operation, white light received through the entrance slit of the spectrometer is diffracted into a continuum of colors and detected by a two-dimensional optical detector for subsequent analysis. Other examples of such systems are disclosed in F. Reininger, "Visible Infrared Mapping Spectrometer-Visible Channel (VIMS-V)," *Instrumentation in Astronomy, VIII* (March 1994); F. Reininger, "Near Ultraviolet Visible Infrared Mapping Spectrometer (NU-VIMS)," *Space Optics*, 1994: *Earth Observation and Astronomy* (April 1994); and Macenka et al. U.S. Pat. No. 5,768,040 for "Wide Field-of-View Imaging Spectrometer."

Unfortunately, prior spectrometers have typically experienced substantial spectral and spatial distortion, or error, resulting largely from the geometry of the overall systems and the resulting mismatch between the fore-optics and the spectrometer portion. In this regard, the detector focal plane and the entrance slit of such spectrometers are typically disposed above and below the diffraction grating, and are displaced from one another in a direction generally parallel to the entrance slit. Although this arrangement has provided reasonably good results, it has not been possible to reduce spatial and spectral distortion ("smile") to the extent desired for accurate spectrographic mapping. In addition, prior spectrometers are not capable of providing high resolution image information because the broad spectrum of incoming light is necessarily broken down into narrow spectra, drastically reducing the signal-to-noise ratio.

Therefore, it is desirable in many applications to provide a spectrometer essentially eliminating spatial and spectral distortion and producing a high quality visual image in conjunction with spectral information.

SUMMARY OF THE INVENTION

In one aspect, the imaging spectrometer/camera of the present invention is capable of providing a spectral image having substantially zero spatial and spectral distortion in a compact and inexpensive unit. This spectrometer can be scaled to any size, independent of its fore-optics, and independent of the field of view and dispersion requirements of a particular application. In addition, a separate camera line array can be provided adjacent the entrance slit of the spectrometer to create a high resolution poly-chromatic image as the device is moved across a target surface in pushbroom fashion. In one particularly advantageous spectrometer structure of the invention, the entrance slit and the two-dimensional spectrometer array are disposed on opposite sides of the diffraction grating in a direction substantially perpendicular to the slit itself. When a camera line array is used, it is typically positioned adjacent and parallel to the slit on the same side of the grating. Alternatively, the camera line array can be disposed "behind" the diffraction grating to provide an even more compact structure.

Various portions of the spectrum of light can diffracted onto different spectrometer arrays, either by forming regions of different diffraction properties on the grating itself, or by placing a dichroic beam splitter in the path of the image immediately in front of the primary spectrometer array. When the surface of the diffraction grating is modified to diffract wavelengths of light differently, the regions of differing diffraction properties are preferably made concentric with each other.

The foregoing results are preferably achieved by an imaging spectrometer comprising: fore-optics for forming an image at an imaging location; and a spectral resolving system comprising an entrance slit extending in a first direction at the imaging location for receiving the image, a convex diffraction grating for separating the image into a plurality of spectra of predetermined wavelength ranges, a spectrometer array for detecting said spectra, and at least one concave mirror concentric with the diffraction grating for relaying said image from the entrance slit to the diffraction grating and from the diffraction grating to the spectrometer array. In one form, the entrance slit and the spectrometer array are displaced laterally on opposite sides of the diffraction grating in a second direction substantially perpendicular to the first direction. In addition, the fore-optics may be substan-tially achromatic, telecentric, and constructed and arranged such that the image is substantially flat at the imaging location. More specifically, the fore-optics may be of the three-mirror anastigmatic type, and may be either a far-field objective, a near-field objective or a microscope objective. In another form, the spectral resolving system may have a plurality of spectrometer arrays for detecting different spectral bands and at least one dichroic beam splitter for dividing the spectrum into a plurality of different portions, each portion containing different bands of the spectrum. The various portions of the spectrum are then directed to the respective spectrometer arrays. At least one lens may be utilized to correct aberrations introduced into the image by the dichroic beam splitter. As a further alternative, the diffraction grating may have a plurality of regions of diffraction characteristics for diffracting the different spectra, and the resolving system may have a plurality of spectrometer arrays for receiving different ones of the spectra from these regions, respectively.

In another form, the device has a polychromatic camera array disposed adjacent the entrance slit of the spectrometer for recording the image with high resolution. Whereas the spectrometer's detector array is preferably two-dimensional, the camera's detector array may be a one-dimensional line array parallel to the entrance slit. In such a configuration, the combined spectrometer and camera are movable together, perpendicular to the line array, to form an image in pushbroom fashion.

BRIEF DESCRIPTION OF THE DRAWINGS

The above and other features of the present invention may be more fully understood from the following detailed description, taken together with the accompanying drawings, wherein similar reference characters refer to similar elements throughout and in which.

DESCRIPTION OF THE PREFERRED EMBODIMENT

Figure 1:
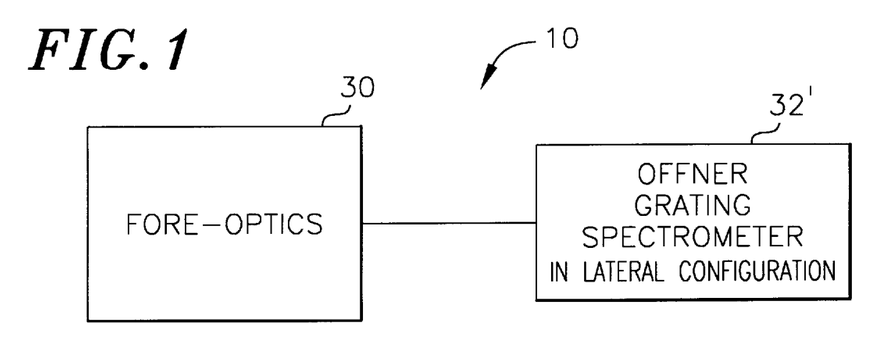
FIG. 1 is a simplified block diagram of an imaging spectrometer constructed in accordance with one embodiment of the invention.
Figure 2:
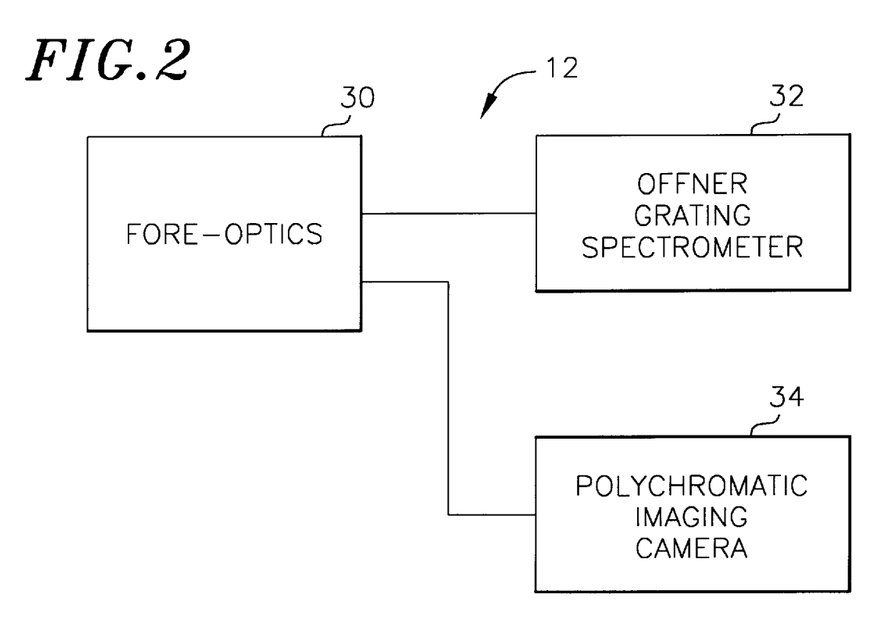
FIG. 2 is a simplified block diagram of a combined imaging spectrometer and camera constructed according to another embodiment of the invention.
Figure 3:
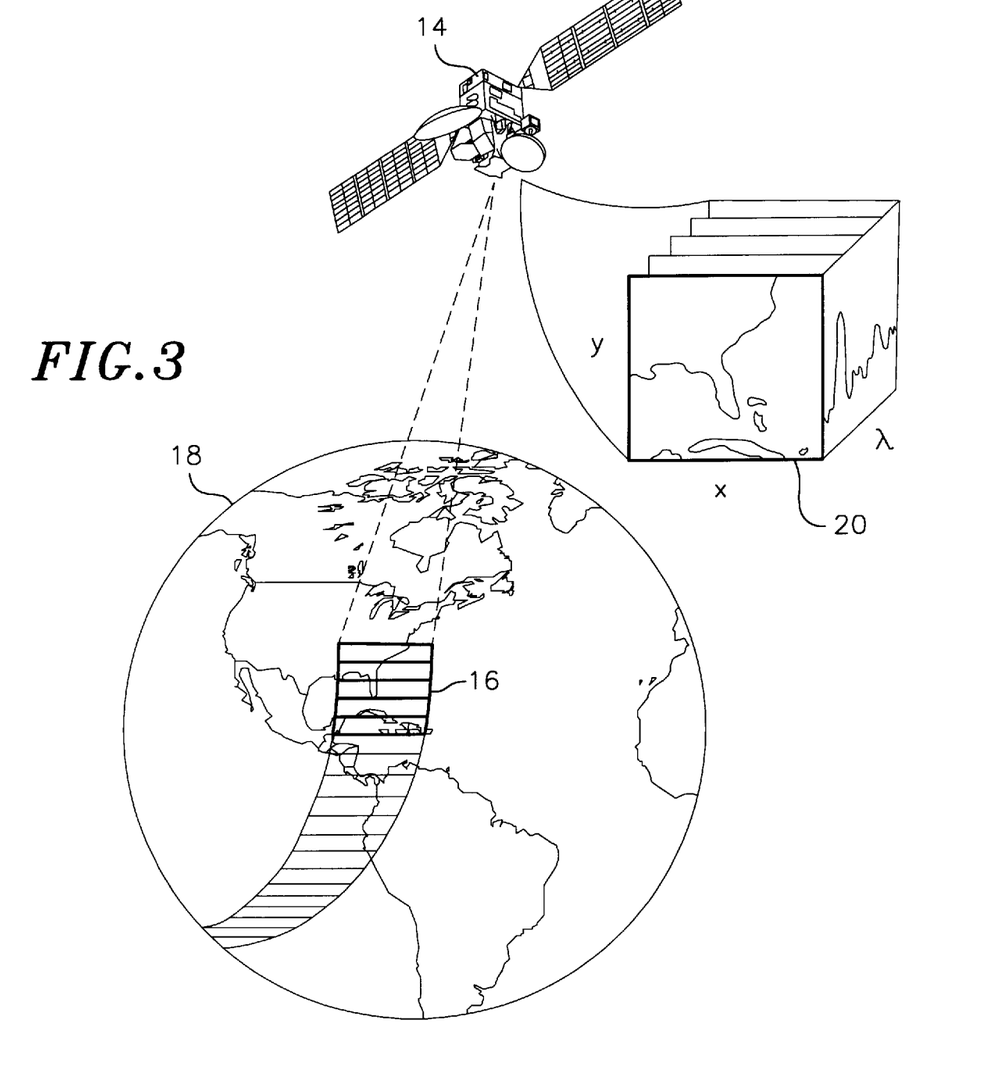
FIG. 3 is a diagrammatic view of a satellite carrying an imaging spectrometer of the present invention in orbit around the earth, and schematically illustrates a data structure created by the spectrometer.

Referring now to the drawings, FIGS. 1 and 2 illustrate imaging spectrometers 10 and 12, respectively, for imaging a target surface in a far-field, near-field or microscopic context. In one arrangement, illustrated in FIG. 3, the spectrometer is carried on board a satellite 14 for imaging a swath 16 of the earth or other planet 18. In this configuration, the imaging spectrometer creates a line image which is swept relative to the planet 18 in "pushbroom" fashion to develop a three-dimensional data structure represented schematically by the data cube 20.

The imaging spectrometer 10 of FIG. 1 is preferably fabricated in a lateral configuration, as illustrated in FIGS. 4, 5, 7, 9 and 10, with an entrance slit 22 and a spectrometer array 24 displaced laterally on opposite sides of a convex diffraction grating 26 in a direction transverse to the entrance slit. This "lateral" configuration can provide essentially zero spatial and spectral distortion ("smile") and permits the use of a long entrance slit 22 which yields a wide field of view.

Figure 5:
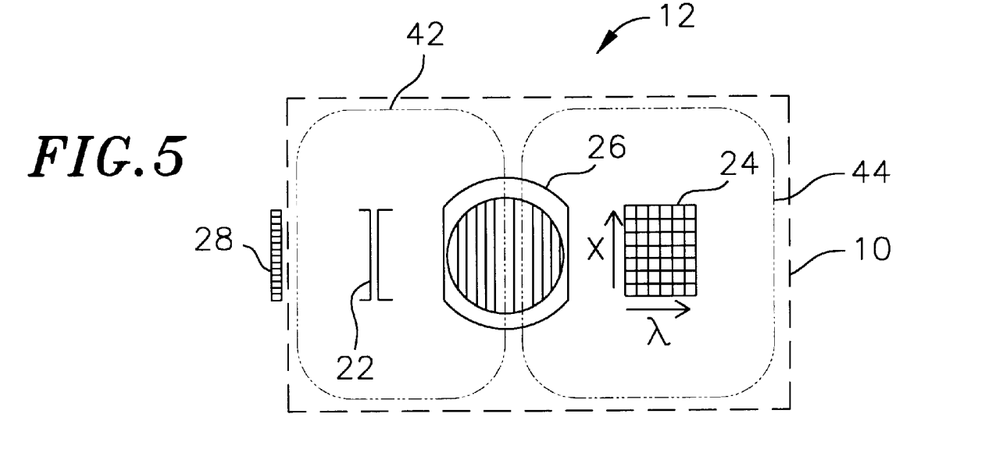
FIG. 5 is a diagrammatic end view taken in the direction 4—4 of FIG. 4, showing the mirrors of the combined spectrometer and camera in phantom lines for clarity, with a camera line array of the device moved outwardly from its FIG. 4 position behind the diffraction grating.

When the imaging spectrometer 10 of FIG. 5 is combined with a polychromatic camera line array 28 parallel to the entrance slit 22, high resolution visible information is gathered at the same time as the spectral output of the spectrometer portion of the system. As shown in FIG. 5, the resulting structure is the combined imaging spectrometer and camera 12. Because the camera array 28 is adjacent and parallel to the entrance slit 22 in the combined structure, the high resolution image gathered during pushbroom operation is closely correlated to the spectral information. The line array 28 moves across the target surface, either slightly ahead of or slightly behind the entrance slit 22, causing the signals to be only slightly out of phase. The data gathered in this way therefore provides high resolution structural information about the target surface as well as full spectral information, permitting the structure and makeup of the target surface to be accurately determined.

Examining the systems of FIGS. 1 and 2 in further detail, the best performance is performed with telecentric, flat field (no Petzval curvature) fore-optics 30 coupled with an Offner grating spectrometer 32' or 32, respectively. While both spectrometers are of the Offner relay type and have a convex diffraction grating, they differ in that the spectrometer 32' is specifically identified as being in the "lateral" configuration of FIGS. 5 and 9, whereas the spectrometer 32 can be in either the lateral or the vertical configuration. As explained in more detail below, the lateral configuration provides certain advantages not obtained by vertically arranged spectrometers. The combined imaging spectrometer and camera 12 of FIG. 2, however, also includes a polychromatic imaging camera 34 which has, as a component, the line array 28 of FIG. 5. In both systems, the fore-optics 30 form an image at a slit of the Offner spectrometer 32' or 32 corresponding to the entrance slit 22 of FIG. 5. The fore-optics 30 of each system are therefore coupled to the Offner grating spectrometer (32' or 32) through its entrance slit, whereas the polychromatic imaging camera 34 is placed near the slit in full exposure to the optical image.

Figure 4:
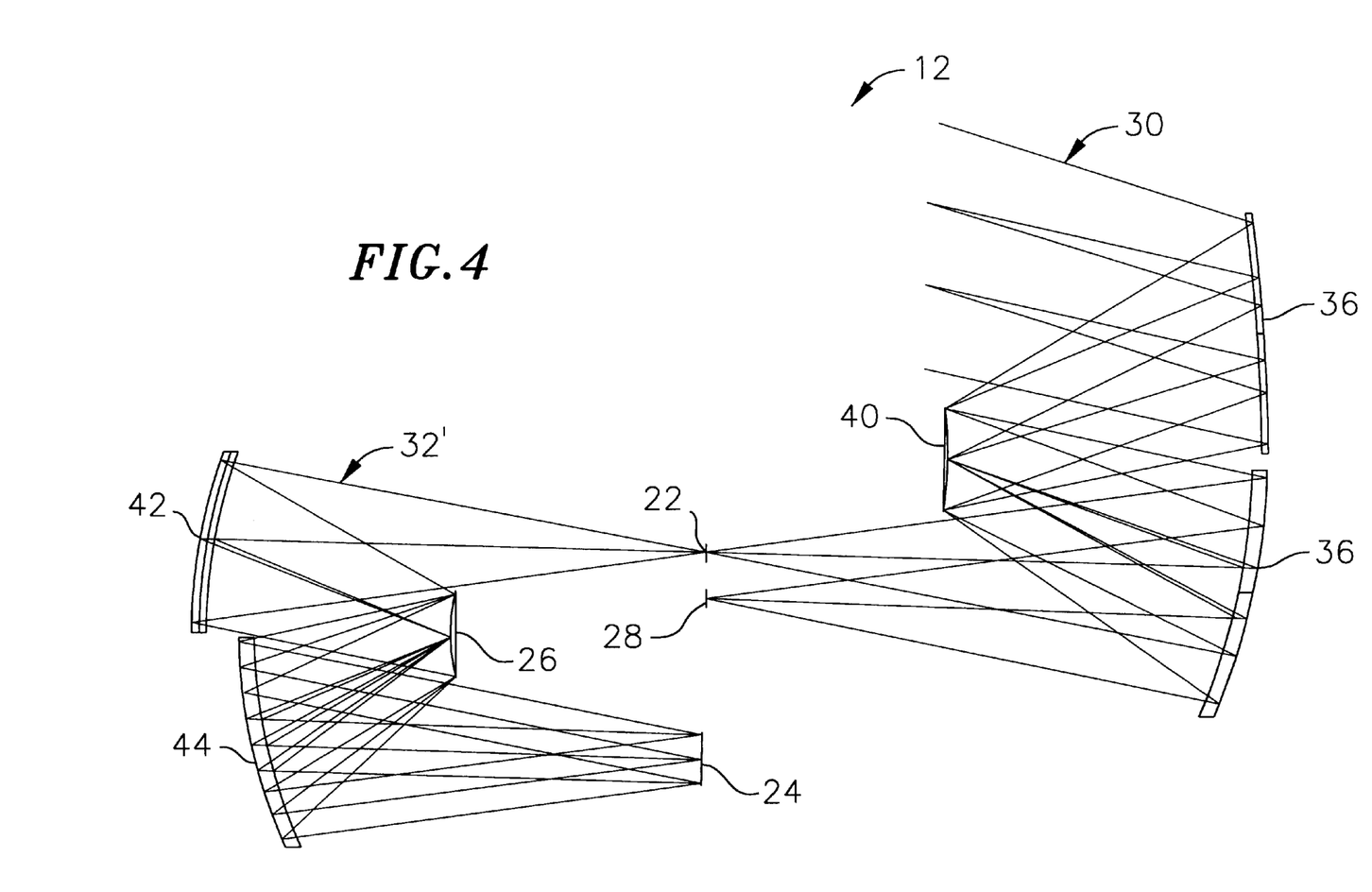
FIG. 4 is an optical ray trace diagram of a combined imaging spectrometer and camera of the type illustrated in FIG. 2 wherein the spectrometer has two tilted sperical relay mirrors and substantially no spectral distortion, shown in plan view.

Examining the structures of FIGS. 4 and 5 in greater detail, FIG. 4 illustrates a form of the fore-optics 30 having a primary fore-optic mirror 36, a fore-optic tertiary mirror 38 and a convex mirror 40 disposed as a secondary reflective surface. Light entering the fore-optics 30 therefore is reflected by the mirrors 36, 40 and 38, in that order, and then focused on the spectrometer entrance slit 22 and the camera line array 28. Although it is preferable that the fore-optics be achromatic, telecentric and without any Petzval curvature, various different forms of objectives or other optical devices can be used. For example, the fore-optics 30 can be a Shafer objective, a conventional multi-mirror objective, a three-mirror anastigmatic ("TMA") objective or any other suitable optical subsystem. Such objectives have a wide field of view, particularly when illuminated at an angle relative to their principal optical axis, and have no spectral distortion because they are reflective.

The "lateral" Offner spectrometer 32' of FIG. 1 can be understood most clearly with reference to FIG. 5, in combination with FIG. 4. The light received by the fore-optics 30 enters the spectrometer portion of the combined imaging spectrometer and camera 12 through the entrance slit 22, from which it impinges on a primary spectrometer mirror 42, As a specific example of the lateral configuration of FIGS. 4 and 5, an optical prescription is provided in TABLE 1 for a three-mirror anastigmatic objective and camera in combination with an Offner imaging spectrometer in the lateral configuration. The description of TABLE 1 is presented in the form utilized by the optical design program marketed under the tradename ZEMAX. In this form, spectral distortion is eliminated.

TABLE 1

Optical Presciption for TMA Telescope/Camera + Offner Imaging Spectrometer

| | |
|---|---|
| Optical Speed | F/3.2 |
| Focal Length | 128 mm |
| Pupil Diameter | 40 mm |
| Field of View | 7.5° |
| Camera Spectral Range | 0.4–0.8 $\mu$m |
| Camera Spatial Resolution | 12 arc-sec |
| Grating Groove Density | 46.465 grooves/mm |
| Diffraction Order | 1 |
| Spectrometer Spectral Range | 1–5 $\mu$m or .85–2.5 $\mu$m |
| Spectrometer Spatial Resolution | 60 arc-sec or 24 arc-sec |
| Spectrometer Spectral Resolution | 13 nm or 2.7 nm |
| Spectrum Length | 12 mm |
| Image Length | 16 mm |
| Camera Off-Axis Field Angle | −16° in X direction |
| Spectrometer Off-Axis Field Angle | −11° in X direction |

| Surface | Type | Name | Radius mm | Thickness mm | Conic | Decenter X mm | Tilt Y degrees |
|---|---|---|---|---|---|---|---|
| object | | | infinity | infinity | | | |
| 1 | mirror | tel. primary | −423.5612 | −79.71568 | −5.03427 | | |
| 2 | mirror | stop | −117.1306 | 79.71568 | 0.2417 | | |
| 3 | mirror | tel. tertiary | −159.5587 | −140.1963 | 0.1940 | | |
| 4 | aperture | camera/slit | infinity | 0 | | | |
| 5 | coord. break | X shift | | −128.1255 | | −45.4056 | |
| 6 | coord. break | Y tilt | | | | | 0.0712 |
| 7 | mirror | spec. primary | 128.0413 | | | | |
| 8 | coord. break | untilt | | 65.32406 | | | −0.0712 |
| 9 | mirror | grating | 62.63789 | −53.21893 | | | |
| 10 | coord. break | Y tilt | | | | | 0.30431 |
| 11 | mirror | spec. tertiary | 115.9235 | | | | |
| 12 | coord. break | untilt | | 115.99626 | | | −0.30431 |
| image | | focal plane | infinity | | | | |
| Performance attributes: | | - telecentric<br>- flat field<br>- less than 0.4 $\mu$m spectral smile<br>- valid for visible or thermal infrared wavelengths | | | | | | the convex diffraction grating 26 and a tertiary spectrometer mirror 44, before reaching the spectrometer array 24 at the focal plane of the spectrometer 32'. In the Offner configuration, the primary spectrometer mirror 42, the diffraction grating 26 and the tertiary spectrometer mirror 44 are all preferably spherical and concentric, although each of these elements may alternatively be aspherical for even better performance. As illustrated in FIG. 5, in order to obtain the benefits of this "lateral" configuration, the entrance slit 22 and spectrometer array 24 are disposed on opposite sides of the diffraction grating 26 and displaced from the grating in a direction substantially perpendicular to the longitudinal axis of the entrance slit 22. When viewed from above (see FIG. 4), the slit 22, the diffraction grating 26 and the spectrometer array 24 are not necessarily located along a straight line, but rather can be displaced from one another in other directions, as well. Nevertheless, it is sufficient for the advantageous "lateral" configuration that the three elements be displaced from one another in at least the one illustrated direction perpendicular to the entrance slit 22.

Figure 7:
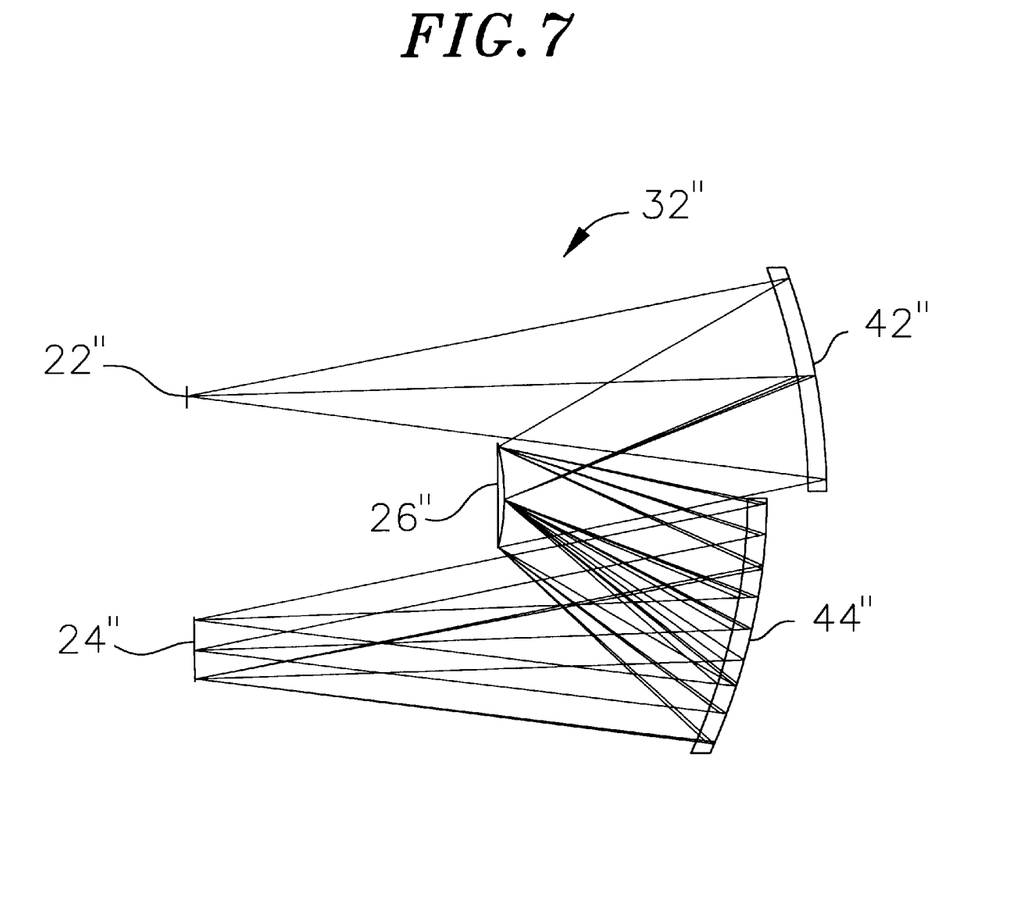
FIG. 7 is an optical ray trace diagram of an imaging spectrometer of the type incorporated in the structure of FIG. 4 having substantially zero spatial and spectral distortion.

FIG. 7 illustrates a variational form of the spectrometer portion of the combined imaging spectrometer and camera 12 of FIG. 4, also having two tilted spherical relay mirrors. Thus, in the imaging spectrometer of FIG. 7, labeled 32", light received through the optical slit 22" impinges on a primary spectrometer mirror 42", a convex diffraction grating 26" and a tertiary spectrometer mirror 44", causing light from the slit image to be spread spectrally over a two-dimensional spectrometer array 24" at the focal plane of the spectrometer. The optical prescription for this form of the spectrometer of the present invention is presented in ZEMAX format in TABLE 2. With this prescription, spectral and spatial distortion are eliminated. If the resulting spectrometer is coupled to achromatic, telecentric fore-optics that have no Petzval curvature, the combination will also have zero spectral and spatial distortion.

TABLE 2

Optical Prescription for Long Slit, Low Distortion Offner Imaging Spectrometer

| | |
|---|---|
| Numerical Aperture | 0.1544 (F/3.2) |
| Slit Length | 16 mm |
| Magnification | 1 |
| Grating Groove Density | 59.4485 grooves/mm |
| Diffraction Order | 1 |
| Spectrometer Spectral Range | 1–5 μm or .85–2.5 μm |
| Spectrometer Spectral Resolution | 13 nm or 2.7 nm |
| Spectrum Length | 12 mm |
| Image Length | 16 mm |

| Surface | Type | Name | Radius mm | Thickness mm | Decenter X mm | Tilt Y degrees |
|---|---|---|---|---|---|---|
| object | aperture | slit | infinity | | | |
| 1 | coord. break | X shift | | 104.1954 | −16.234 | |
| 2 | coord. break | Y tilt | | | | 0.05835 |
| 3 | mirror | primary | −104.0068 | | | |
| 4 | coord. break | untilt | | −53.74617 | | −0.05835 |
| 5 | mirror | grating | 50 | 42.94951 | | |
| 6 | coord. break | Y tilt | | | | 0.0764 |
| 7 | mirror | tertiary | 93.2548 | | | |
| 8 | coord. break | untilt | | 93.58568 | | −0.0764 |
| image | | focal plane | infinity | | | |

Performance attributes:
- telecentric
- flat field
- less than 4% spectral registration error
- less than 1 μm spatial smile
- less than 1 μm spectral smile
- valid for visible or thermal infrared wavelengths As noted above, FIG. 9 illustrates another variational form of the lateral spectrometer of FIG. 1, identified as 112, having a single relay mirror 142. Like the mirrors 42 and 44 of FIGS. 4 and 5, the relay mirror 142 is shown in phantom lines to avoid obscuring the important spatial relationship between an entrance slit 122, a convex diffraction grating 126 and a spectrometer array 124 of the device. As encountered in the structure of FIG. 5, a camera line array 128 may be located adjacent the entrance slit 122 to provide a high resolution, polychromatic image in conjunction with the spectral images created by the spectrometer array 124.

Figure 10A:
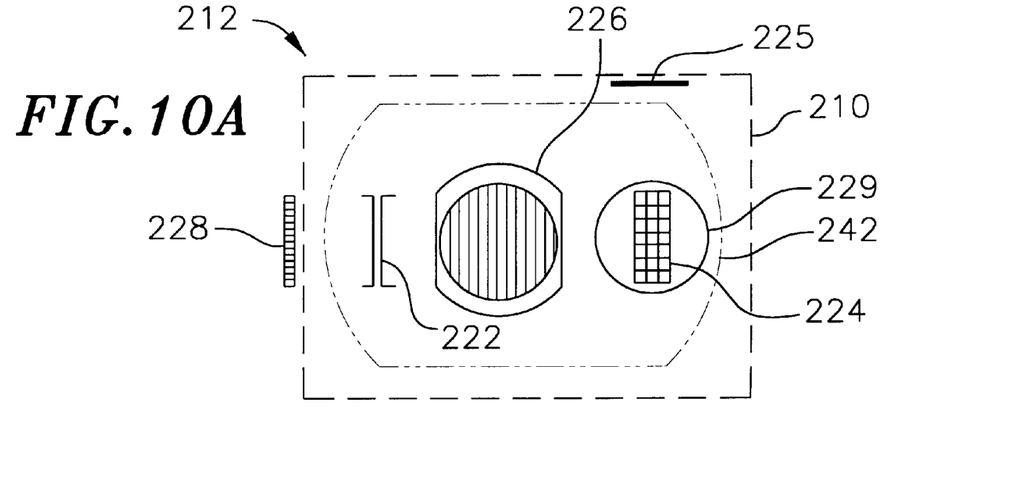
FIG. 10A is a diagrammatic end view of a combined imaging spectrometer and camera similar to that of FIG. 9, but having a second spectrometer array illuminated by a portion of the diffracted spectrum using a dichroic beam splitter.
Figure 10B:
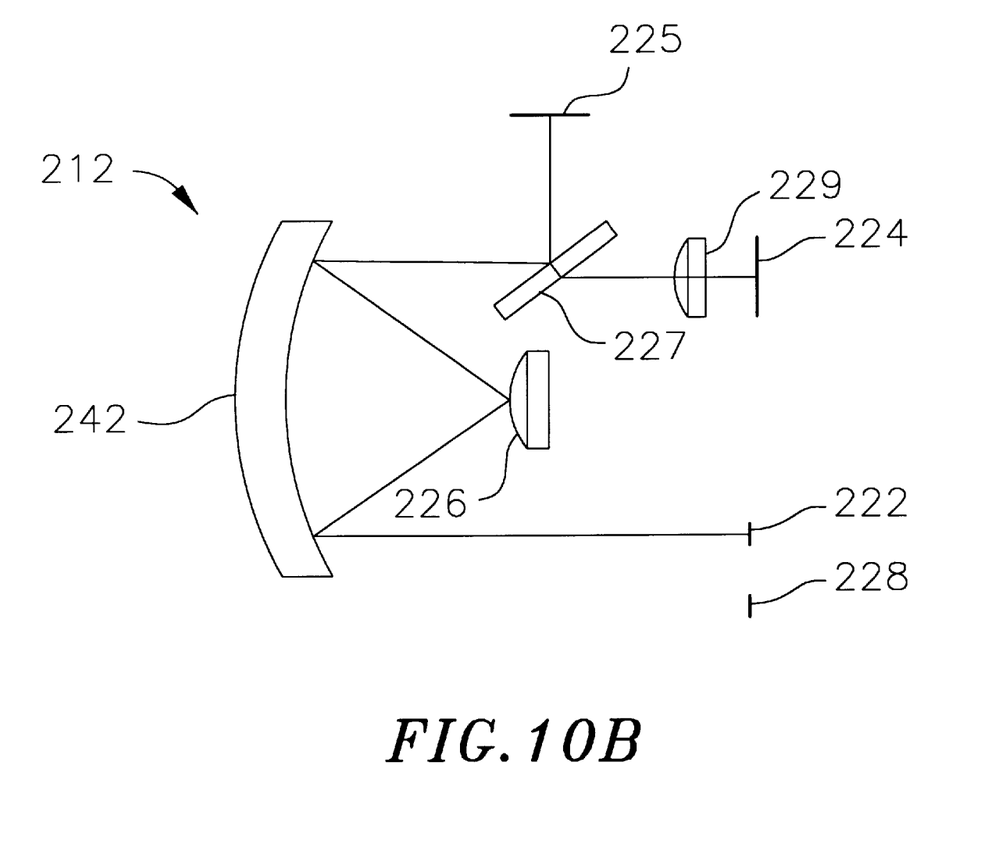
FIGURE 10B is a schematic plan view of the combined imaging spectrometer and camera of FIGURE 10A, with a second spectrometer array rotated through 90 degrees for clarity.

FIG. 10A illustrates an imaging spectrometer 210 and a corresponding combined imaging spectrometer and camera 212 embodying another variation on the lateral configuration of the invention. The device 212 has an entrance slit 222, a diffraction grating 226, a spectrometer array 224 and a camera line array 228, all analagous to the corresponding elements of FIGS. 5 and 9, but also have a second two-dimensional spectrometer array 225 rotated 90 degrees relative to the spectrometer array 224. The second array 225 is provided to receive a preselected portion of the diffracted light by virtue of a dichroic beam splitter (not shown in FIG. 10A) positioned in front of the first spectrometer array 224. The dichroic beam splitter is illustrated in FIG. 10B, which is a plan view of FIG. 10A, element 227. Because the beam splitter is made of glass, however, it introduces spectral aberrations which must be corrected by a lens 229.

In a preferred embodiment, the dichroic beam splitter 227 is designed to pass light in the wavelength range of 0.4 to 1.0 micrometers (thus causing it to impinge on the first spectrometer array 224) and to reflect light in the wavelength range of 1.0 to 5.0 micrometers toward the second spectrometer array 225. The shorter wavelength spectral resolution can be increased by using a higher spectral order than "1".

Although the embodiment of FIG. 1 is primarily described in relation to the lateral configuration, it will be understood that other spectrometer configurations can be employed, particularly in the combined spectrometer and camera of FIG. 2. Two specific examples are devices 312 and 412 of FIGS. 6 and 8, respectively, each of which is constructed in a "vertical" configuration, meaning that its spectrometer entrance slit (322 or 422) and its spectrometer array (324 or 424) are positioned oppositely relative to its diffraction grating (326 or 426) in a direction parallel to the longitudinal axis of its entrance slit. This arrangement typically results in a shorter entrance slit, and therefore a shorter image, but can provide a longer spectrum of diffracted radiation than the lateral configuration of FIGS. 4 and 5. It can also allow the second spectrum to be of higher resolution and tailored for optimal efficiency. The camera line arrays (328 and 428) of the two vertical devices are located parallel to the entrance slits 322 and 422 of their respective spectrometers, as found in the lateral devices of FIGS. 4,5,9 and 10A.

Figure 8:
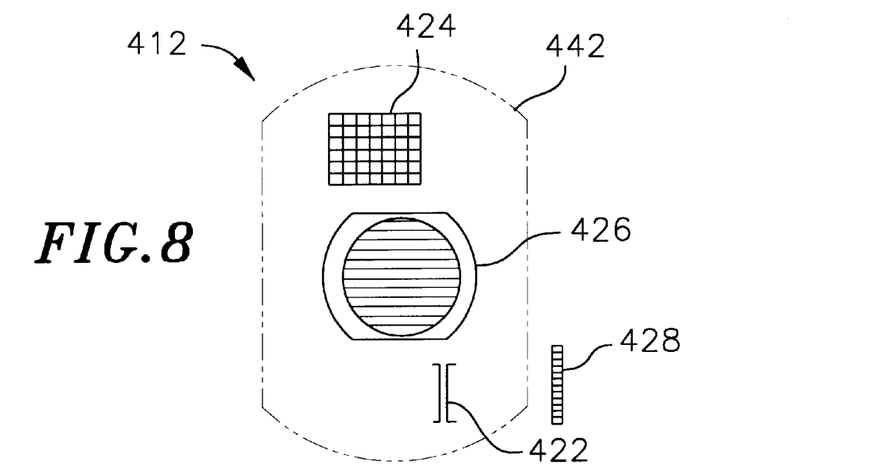
FIG. 8 is a combined imaging spectrometer and camera in the "vertical" configuration of FIG. 8, but with a single relay mirror.
Figure 9:
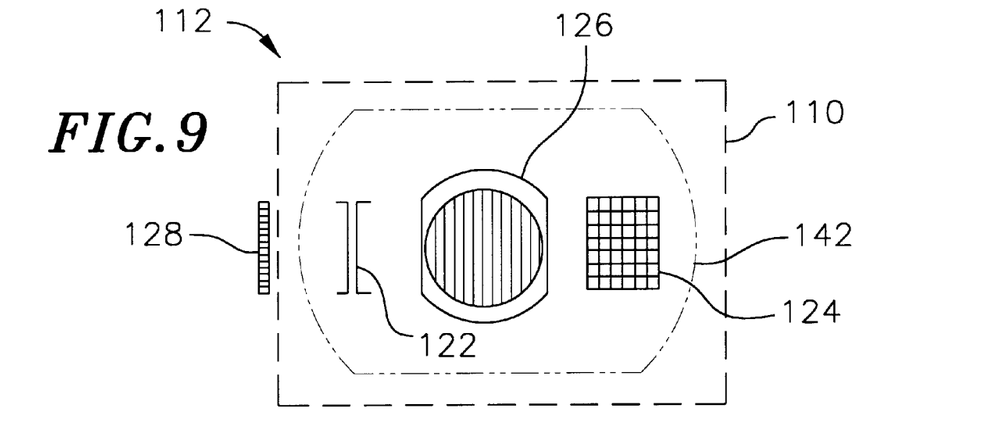
FIG. 9 is a combined imaging spectrometer and camera in the "lateral" configuration of FIG. 5, but with a single relay mirror.
Figure 11:
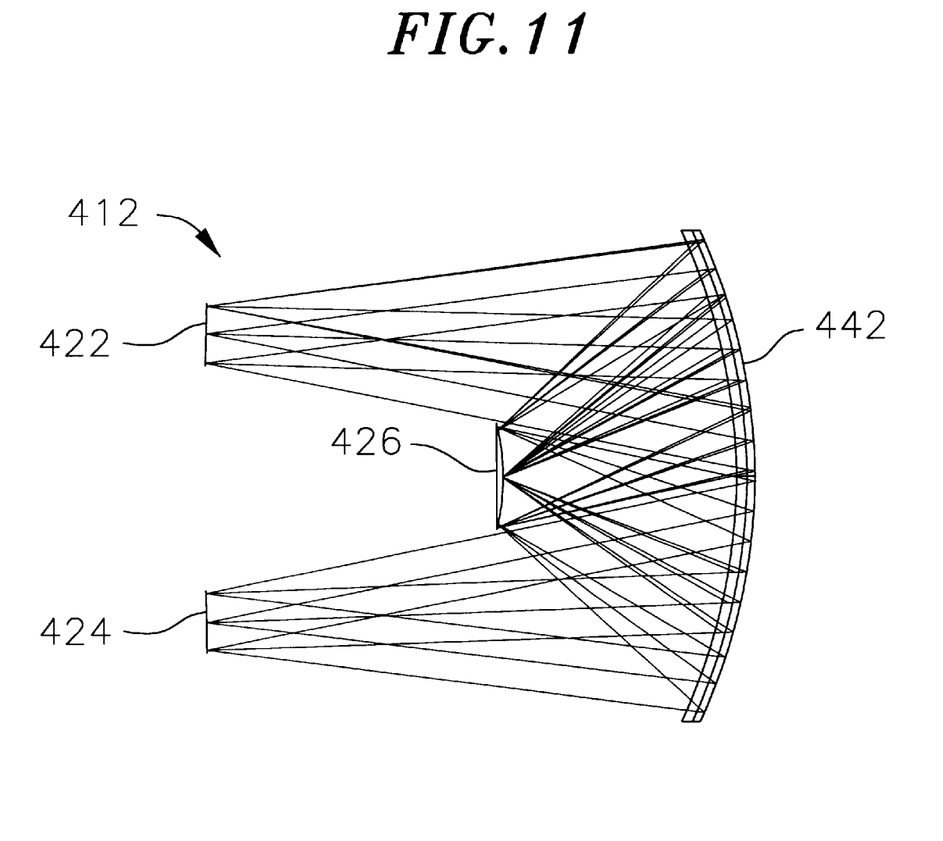
FIG. 11 is an optical ray trace diagram of an imaging spectrometer incorporated in the device of FIG. 8, shown in elevation.

As a specific example, TABLE 3 contains an optical prescription for the combined imaging spectrometer and camera 412 of FIGS. 8 and 11 in ZEMAX format. This device has a single a relay mirror 442, which is shown in phantom lines for clarity. A ray trace of the spectrometer contained in the device 412 is illustrated in FIG. 11.

TABLE 3

Optical Prescription for Long Spectrum, Single Relay Mirror Offner Imaging Spectrometer

| | | | | | |
|---|---|---|---|---|---|
| Numerical Aperture | | | 0.1544 (F/3.2) | | |
| Slit Length | | | 10 mm | | |
| Magnification | | | 1 | | |
| Grating Groove Density | | | 79.777 grooves/mm | | |
| Diffraction Order | | | 1 | | |
| Spectrometer Spectral Range | | | 1–5 $\mu$m (or .85–2.5 $\mu$m) | | |
| Spectrometer Spectral Resolution | | | 10 nm (or 2 nm) | | |
| Spectrum Length | | | 16 mm | | |
| Image Length | | | 10 mm | | |

| Surface | Type | Name | Radius mm | Thickness mm | Decenter mm |
|---|---|---|---|---|---|
| object | aperture | slit | infinity | | |
| 1 | coord. break | X shift | | | –7.2704 X |
| 2 | coord. break | Y shift | | 96.89127 | 22.5201 Y |
| 3 | mirror | asphere relay | –99.23096 | –46.2682 | |
| 4 | mirror | grating | 49.24467 | 46.2682 | |
| 5 | mirror | asphere relay | –99.23096 | –96.2911 | |
| image | | focal plane | infinity | | |
| 3,5 | even asphere | coefficients | –1.68277e-4 | –7.82139e-9 | –3.46473e-12 |

Figure 6:
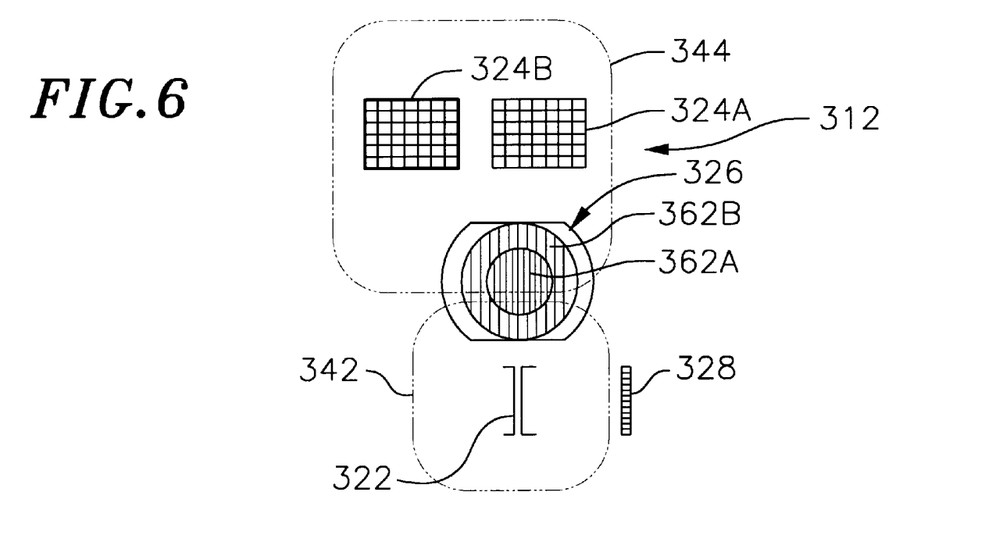
FIG. 6 is a diagrammatic end view of a combined spectrometer and camera similar to that of FIG. 5, but with its entrance slit, diffraction grating and spectrometer arrays disposed in a "vertical" rather than a "lateral" configuration.

Performance attributes:
- telecentric
- flat field
- less than 4% spectral registration error
- less than 3 $\mu$m spatial smile
- less than 4 $\mu$m spectral smile
- valid for visible or thermal infrared wavelengths Referring again to the combined spectrometer and camera 312 of FIG. 6, light entering through a spectrometer entrance slit 322 is reflected by a primary relay mirror 342 onto a convex diffraction grating 326, from which it is diffracted toward a tertiary spectrometer mirror 344 and onto a pair of spectrometer arrays 324A and 324B. Diffraction onto the two different spectrometer arrays is accomplished by providing the diffraction grating 326 with a plurality of regions of different diffraction characteristics. Thus, the grating 326 is made up of a plurality of different grating regions formed concentrically on a common substrate. An inner grating region is designed to operate "partially coherently" to diffract light of shorter wavelengths, such as ultraviolet and visible light, onto the spectrometer array 324A, whereas the outer grating region 326B is constructed to diffract infrared radiation onto the spectrometer array 324B. The difference in the grating portions typically involves their groove densities, with the shorter wavelength portion having grooves formed closer together than the longer wavelength portion. The depths and profiles of the grooves also help determine their diffraction characteristics, including but not limited to the angle at which light of a given wavelength is diffracted by the grating. It is also possible, by careful control of the grooves and careful placement of the spectrometer arrays, to make use of "orders" of diffracted radiation of opposite sign.

The vertical design of FIG. 6, with a dual grating and a dual focal plane, can be used for very broad spectral coverage with substantially no spectral smile and minimal spatial smile. The two concave relay mirrors 342 and 344 can be made aspherical for best performance and tilted about the central axis. The focal planes can also be tilted about the sagittal and tangential axes. In addition, order sorting filters can be used and the response functions of the spectrometer arrays 324A and 324B can be tailored to eliminate the effects of stray light.

Figure 12:
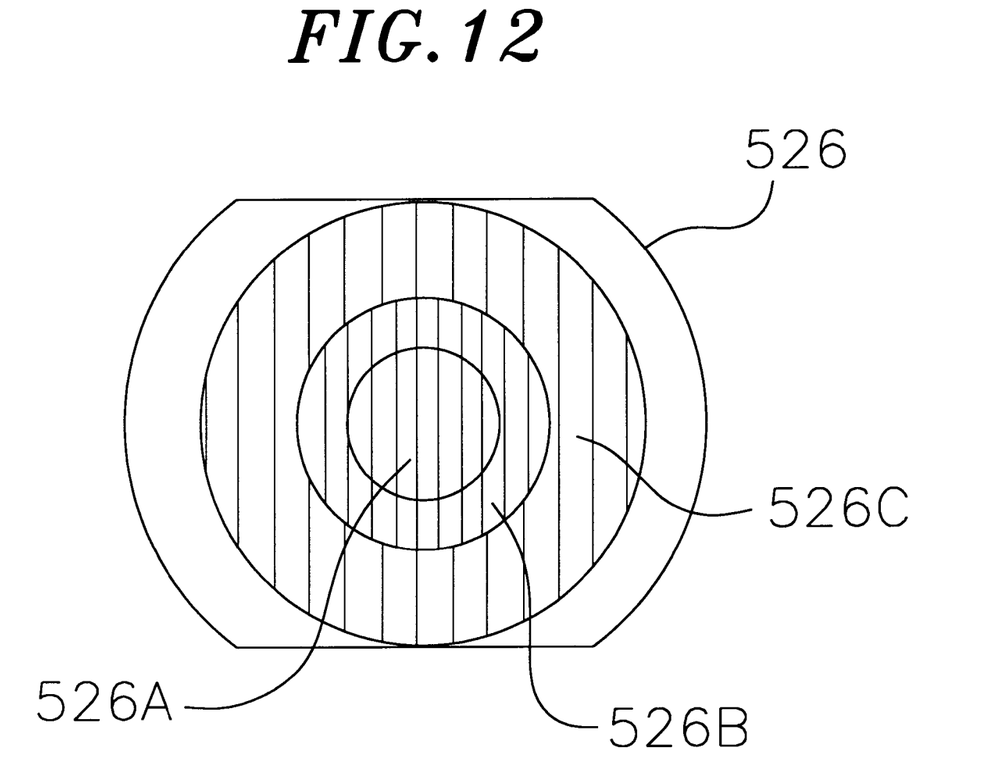
FIG. 12 is an elevational view of an alternative form of a diffraction grating having regions of different groove characteristics.

Another special form of diffraction grating is illustrated in FIG. 12, in which a diffraction grating 526 has concentric "zones" 526A, 526B and 526C of different diffraction characteristics. The inner two zones (526A and 526B) have the same high groove density, causing them to diffract light of shorter wavelengths, but have different groove depths to enhance the diffraction efficiency at certain specific sub-bands. The outer zone (526C) has a lower groove density, causing it to diffract light of longer wavelength preferentially. In addition, the inner two zones can be blazed at a different angle and opposite direction (order) than the outer zone in order to direct diffracted light to a different spectrometer array, as disclosed with respect to FIG. 6.

The prescriptions of TABLES 1–3 can be used for a variety of different wavelength ranges by changing the groove density and the characteristics of the spectrometer array. The groove profile, on the other hand, does not enter into the optical prescription: blazed (saw tooth), sinusoidal, and rectangular groove profiles will all work. It also does not matter whether the grating is manufactured using a diamond stylus, holographic recording, ion beam etching, electron beam lithography or laser ablation. In some cases it is necessary, however, to alter the groove profile for different applications to achieve high efficiency over specific regions of the spectrum.

In each of the embodiments described above, the output of the spectrometer arrays is passed to suitable electronics for processing and storing of the spectral and image data. These electronics and the techniques employed are of known design and therefore are not described in detail here. Among the techniques available to process the data is the introduction of a slight time delay to eliminate curvature or spatial "smile" of an image due to the use of off-axis fore-optics.

In use, the spectrometer 10 or the spectrometer and camera 12 require either a scanning mirror or a moving platform, such as an aircraft or spacecraft, to generate the second dimension of the image. Both the imaging spectrometer and the high resolution polychromatic imager (the line array camera) then image the same areas of the target surface within a few seconds of each other. Typical applications of these devices are planetary atmospheric sounding, planetary mineralogical mapping, forestry and vegetation mapping, pollution monitoring, ocean mapping, and petroleum field mapping. When operating with fore-optics designed for the near field, a spectroscopic image may be obtained with a scan mirror, by moving the imaging spectrometer, or by moving a target object past the entrance slit of the spectrometer. Applications include local prospecting, in-situ pollution monitoring, autonomous imaging spectroscopy of hazardous wastes, and topological studies of the human body. For example, a near-field imaging spectrometer can be used to scan a patient's body. An immediate spectroscopic analysis can reveal surface carcinogens, such as melonoma, without the need for invasive surgery. With a microscope objective objective as the fore-optics, a very small specimen can be moved slowly past the microscope objective's conjugate object plane.

While the preferred embodiment has been described and illustrated, various substitutions and modifications may be made thereto without departing from the scope of the invention. Accordingly, it is to be understood that the present invention has been described by way of illustration and not limitation.

What is claimed is:

1. A spectral resolving system comprising:

an entrance slit for receiving an image;

a convex diffraction grating for separating said image into a plurality of spectra of predetermined wavelength ranges;

a spectrometer array for detecting said spectra; and at least one concave asymmetric mirror substantially concentric with the diffraction grating for relaying said image from the entrance slit to the diffraction grating and from the diffraction grating to the spectrometer array 2. The spectral resolving system of claim 1 wherein:

the entrance slit, the diffraction grating, the spectrometer array and said at least one concave mirror are in the Offner configuration.

3. The spectral resolving system of claim 1 having: substantially zero spatial and spectral distortion.

4. An imaging spectrometer comprising:

fore-optics for forming an image at an imaging location; and a spectral resolving system comprising:
   an entrance slit for receiving said image;
   a convex diffraction grating for separating said image into a plurality of spectra of predetermined wavelength ranges;
   a spectrometer array for detecting said spectra; and
   at least one concave asymmetric mirror substantially concentric with the diffraction grating for relaying said image from the entrance slit to the diffraction grating and from the diffraction grating to the spectrometer array;

5. The imaging spectrometer of claim 4 wherein:

said fore-optics are substantially achromatic, telecentric, and constructed and arranged such that said image is substantially flat at the imaging location.

6. The imaging spectrometer of claim 4 wherein:

said fore-optics comprise a far-field objective.

7. The imaging spectrometer of claim 4 wherein:

said fore-optics comprise a near-field objective.

8. The imaging spectrometer of claim 4 wherein:

said fore-optics comprise a microscope objective.

9. The imaging spectrometer of claim 5 wherein:

said fore-optics have a principal optical axis and are constructed and arranged to receive light substantially along said axis.

10. The imaging spectrometer of claim 5 wherein said fore-optics:

are of the three-mirror anastigmatic type;

have a principal optical axis; and are constructed and arranged to receive light in a direction displaced angularly from the principal optical axis.

11. The imaging spectrometer of claim 4 wherein the spectral resolving system has:

a plurality of said spectrometer arrays for detecting said spectra; and at least one dichroic beam splitter for dividing said image into a plurality of spectral portions, each containing different ones of the spectra, and directing said spectral portions to said spectrometer arrays, respectively.

12. The imaging spectrometer of claim 11 wherein:

said different ones of said spectra are of different diffraction orders.

13. The imaging spectrometer of claim 11 which further comprises:

at least one lens for correcting aberrations introduced into said image by at least one dichroic beam splitter.

14. A combined imaging spectrometer and camera comprising:

fore-optics for forming an image at an imaging location;

a spectral resolving system comprising:
    an entrance slit for receiving said image;
    a convex diffraction grating for separating said image into a plurality of spectra of predetermined wavelength ranges;
    a spectrometer array for detecting said spectra;
    at least one concave mirror substantially concentric with the diffraction grating for relaying said image from the entrance slit to the diffraction grating and from the diffraction grating to the spectrometer array; and a full spectrum imaging camera array disposed adjacent said entrance slit for recording said image.

15. The combined imaging spectrometer and camera of claim 14 wherein:

the camera array is a one-dimensional line array parallel to the entrance slit.

16. The combined imaging spectrometer and camera of claim 15 wherein:

the spectrometer array is a two-dimensional array.

17. The combined imaging spectrometer and camera of claim 16 wherein:

the combined spectrometer and camera is movable perpendicular to the line array to form an image in pushbroom fashion.

18. The combined imaging spectrometer and camera of claim 17 wherein:

said fore-optics are substantially achromatic, telecentric, and constructed and arranged such that said image is substantially flat at the imaging location.

19. The combined imaging spectrometer and camera of claim 18 wherein:

said fore-optics are of the three-mirror anastigmatic type.

20. The combined imaging spectrometer and camera of claim 15 wherein:

said fore-optics comprise a far-field objective.

21. The combined imaging spectrometer and camera of claim 15 wherein:

said fore-optics comprise a near-field objective.

22. The combined imaging spectrometer and camera of claim 15 wherein:

said fore-optics comprise a microscope objective.

23. The imaging spectrometer of claim 14 wherein:

the diffraction grating has a plurality of regions of different diffraction characteristics for diffracting said spectra; and the spectral resolving system has a plurality of spectrometer arrays for receiving different ones of said spectra from said regions, respectively.

24. The imaging spectrometer of claim 14 wherein:

said regions are formed on a common substrate.

25. A spectral resolving system comprising:

an entrance slit for receiving an image;

a convex diffraction grating for separating said image into a plurality of spectra of predetermined wavelength ranges;

a spectrometer array for detecting said spectra; and at least one concave mirror substantailly concentric with the diffraction grating but tilted with respect to it, for relaying said image from the entrance slit to the diffraction grating and from the diffraction grating to the spectrometer array.

26. The spectral resolving system of claim 25 wherein: the entrance slit, the diffraction grating, the spectrometer array and said at least one concave mirror are in the Offner configuration.

27. The spectral resolving system of claim 25 having:

substantially zero spatial and spectral distortion.

28. An imaging spectrometer comprising:

fore-optics for forming an image at an imaging location; and po1 a spectral resolving system comprising:

an entrance slit for receiving said image;

a convex diffraction grating for separating said image into a plurality of spectra of predetermined wavelength ranges;

a spectrometer array for detecting said spectra; and at least one concave mirror substantially concentric with the diffraction grating and tilted with respect to it, for relaying said image from the entrance slit to the diffraction grating and from the diffraction grating to the spectrometer array.

29. The imaging spectrometer of claim 28 wherein:

saidfore-optics are substantially achromatic, telecentric, and constructed and arranged such that said image is substantially flat at the imaging location.

30. The imaging spectrometer of claim 28 wherein:

said fore-optics comprise a far-field objective.

31. The imaging spectrometer of claim 28 wherein:

said fore-optics comprise a near-field objective.

32. The imaging spectrometer of claim 28 wherein:

said fore-optics comprise a microscope objective.

33. The imaging spectrometer of claim 29 wherein:

said fore-optics have a principal optical axis and are constructed and arranged to receive light substantially along said axis.

34. The imaging spectrometer of claim 29 wherein said fore-optics:

are of the three-mirror anastigmatic type;

have a principal optical axis, and are constructed and arranged to receive light in a direction displaced angularly from the principal optical axis.

35. The imaging spectrometer of claim 28 wherein the spectral resolving system has:

pluarlity of said spectrometer arrays for detecting said spectra; and at least one dichroic beam splitter for dividing said image into a plurality of spectral portions, each containing different ones of the spectra, and directing said spectral portions to said spectrometer arrays, respectively.

36. The imaging spectrometer of claim 35 wherein:

said different ones of said spectra are of different diffraction orders.

37. The imaging spectrometer of claim 35 which further comprises:

at least one lens for correcting aberrations introduced into said image by at least one dichroic beam splitter.

* * * * *

UNITED STATES PATENT AND TRADEMARK OFFICE
CERTIFICATE OF CORRECTION

PATENT NO. : 6,100,974
DATED : August 8, 2000
INVENTOR(S) : Francis M. Reininger It is certified that error appears in the above-identified patent and that said Letters Patent is hereby corrected as shown below:

Title page,
ABSTRACT, line 7, replace "sperical" with -- spherical --.

Column 11,
Line 35, replace "array" with -- array. --
Line 56, replace "spectrometer array;" with -- spectrometer array. --.

Column 12,
Line 56, replace "pushbroom fashion" with -- push broom fashion. --.

Column 13,
Line 37, after "location; and" delete "pol" and begin a new paragraph with -- a spectral resolving system comprising:".

Column 14,
Line 6, replace "saidfore-optics;" with -- said fore-optics --.
Line 29, replace "pluarlity" with -- a plurality --.

Signed and Sealed this

Sixteenth Day of April, 2002

Attest:

JAMES E. ROGAN
Director of the United States Patent and Trademark Office

Attesting Officer